United States Patent [19]
Grafen et al.

[11] Patent Number: 5,217,514
[45] Date of Patent: Jun. 8, 1993

[54] FILTERING DEVICE FOR TENTER TREATMENT GASES

[75] Inventors: Karl Grafen; Theo Schiffers, both of Wurselen, Fed. Rep. of Germany

[73] Assignee: H. Krantz GmbH & Co., Aachen, Fed. Rep. of Germany

[21] Appl. No.: 787,646

[22] Filed: Nov. 4, 1991

[30] Foreign Application Priority Data
Nov. 22, 1990 [DE] Fed. Rep. of Germany ....... 4037098

[51] Int. Cl.⁵ .............................................. B01D 46/04
[52] U.S. Cl. ........................................ 55/291; 55/295; 55/351; 55/429
[58] Field of Search ................. 55/291, 295, 302, 351, 55/353, 429

[56] References Cited
U.S. PATENT DOCUMENTS
3,487,620 1/1970 Klein et al. ............................ 55/222
4,193,777 3/1980 de la Riviere .................... 55/295 X
4,883,506 11/1989 Ribnitz .............................. 55/351 X FOREIGN PATENT DOCUMENTS
8529852 1/1986 Fed. Rep. of Germany .

Primary Examiner—Charles Hart
Attorney, Agent, or Firm—Mark T. Basseches

[57] ABSTRACT

A filtering device for a tenter for the gaseous treatment of fabrics includes a movable filtering belt which traverses the entire length and cross section of the tenter. Pressure nozzles on the clean side of the belt dislodge collected materials into waste collectors which are in communication with discharge dusts traversed by the belt, the belt thus filters gases returned for internal circulation and gases emitted to the atmosphere.

6 Claims, 3 Drawing Sheets

FILTERING DEVICE FOR TENTER TREATMENT GASES

BACKGROUND OF THE INVENTION

This invention relates to a filtering device for the gaseous treatment medium of a tenter for hot treatment of a textile web. The filtering device comprises a screen belt, on the clean side (the side away from the fabric) of which pressure lines with nozzles directed against the screen belt are arranged, opposite which collecting means are disposed on the impurity-laden side of the screen.

PRIOR ART

Such a filtering device is known from DE-GM 85 29 852. The gas circulated via a blower and a flow duct impinges on the textile web and in so doing takes up particles of the textile web. A screen crossing the flow duct and extending over the cross section thereof retains the particles. For cleaning the screen, there is connected at the flow duct end near the pressure side of the blower a stationary conduit which leads to the backside of the screen and is provided with an outlet slit which extends over a dimension of the screen and is movable in a perpendicular direction to the length of the outlet slit.

In the known device, by connecting the conduit near the pressure side of the blower, a part of the circulated gas is conducted via the conduit to the back or clean side of the screen and issues via an outlet slit as scavenging gas against the screen. The concentration of the issuing scavenging gas jet and the resulting impulse are sufficient to penetrate the screen from the clean side thereof against the gas circulation flow and to clean the screen.

Devices of this kind have the disadvantage that a central cleaning of the gaseous treatment medium of a tenter requires extensive ducts for conveying the impurity-laden treatment medium to the filtering device and thence to distribute it again over the textile web. Besides, strict regulations regarding limitation of pollutants in gases which are extracted from the treatment process and released into the open make it necessary to filter also these waste gases, for which reason in addition to the internal filtering system which purify the circulated gas stream, additional filtering systems which purify the discharged waste gas stream are necessary.

SUMMARY OF THE INVENTION

It is an object of the invention to design a filtering device of the initially described kind in such a way that both the circulated treatment medium and the portion thereof to be discharged into the open as waste gas can be purified in a simple manner while doing away with an extensive duct system.

For the solution of this problem there is provided a gas filtering device for a tenter comprising a movable filtering screen belt which divides the tenter into two zones, namely a first treatment zone below the belt in which the fabric web is located and a second clean zone above the belt. Pressure lines in the clean zone have nozzles directed against the belt, and waste collecting means are disposed below the nozzles. Waste gas ducts under negative pressure traverse said zones the ducts opening to the first or treatment zone.

According to the invention the screen belt extends over the full length of the tenter, and thus, for each tenter field, the gas stream circulated therein can be cleaned after the textile web treatment and the textile web can be treated again with the purified gas stream. Moreover, the screen belt extending over the total length of the tenter makes it possible to conduct also the part of the treatment medium extracted from each tenter field as waste gas through the screen belt, so that the new filtering device makes sure also that waste gases are discharged into the atmosphere exclusively in a purified state.

According to a preferred embodiment of the invention the collecting means consist of gas-permeable bags arranged in housings disposed below the screen belt, which communicate via openings in at least one housing wall with the suction side of a waste gas duct.

With this design, the impurities detached from the screen belt, such as fiber fragments and dusts, can reliably be collected in the bags and can be retained by the vacuum prevailing therein. The impurity-laden bags can be removed from the housing with few manipulations and be replaced by empty bags.

To intensify the cleaning effect brought about by nozzle jets, a further embodiment of the invention provides the arrangement of rotating brushes extending over the width of the screen belt on the impurity-laden side thereof, laterally of the jet zone of the nozzles.

The screen belt may be endless, the collecting means being arranged between a top section serving for filtering and a bottom section guided at an appropriate distance therefrom. It appears to be more advantageous, however, to use a screen belt of finite length and, according to a further embodiment of the invention, to mount each end of the screen belt on a winding shaft on which a portion of the screen belt not in use can be stored in a coiled state.

In this form of realization, the length of the screen belt portion in use can be limited to the length of one tenter field, since each tenter field has a cleaning station for the screen belt assigned to it.

To stabilize the screen belt and to prevent a leakage flow by-passing the screen belt, a further embodiment of the invention provides for each longitudinal edge of the screen belt portion in use to be guided in a track.

For further stabilization of the screen belt, which depending on its flow resistance tends to shift vertically or to become deformed, a variant of the invention lastly provides for the arrangement of support rods extending over the length of the screen belt portion in use, over the width thereof, at intervals.

Figure 1:
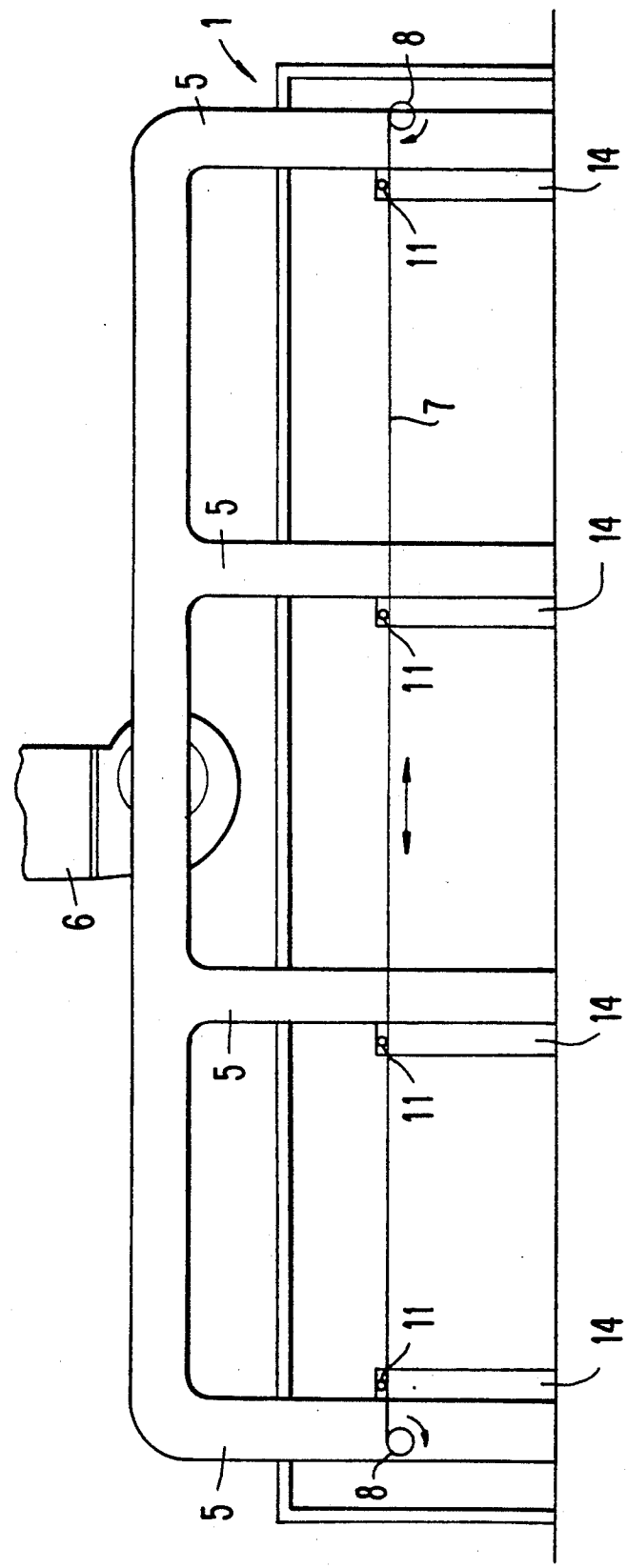
FIG. 1 shows schematically a vertical longitudinal section through a tenter equipped with the filtering device.

In a conventional tenter 1 composed of three fields, a gas stream is ejected in each field from nozzle boxes 3 (FIG. 2) communicating with the pressure side of a blower 4 for treatment of a textile web 2. After impingement on the textile web 2, the gas stream is conducted to the suction side of blower 4. Only a portion of the gas stream is sent via a waste gas duct 5 to the suction side of a central waste gas blower 6.

The gas stream circulated by the blower 4 as well as the waste gas stream removed by the waste gas blower 6 is forced through a screen belt 7, which extends over the length of tenter 1 and which crosses all waste gas ducts. The ends of screen belt 7 are storable on a winding shaft 8 which is mounted in bearings at the beginning and end of tenter 1. The winding shafts 8 are driveable alternately in a direction of rotation applying tensile stress to screen belt 7, so that the screen belt 7 can be shifted to the right or left by at least one field length.

Figure 2:
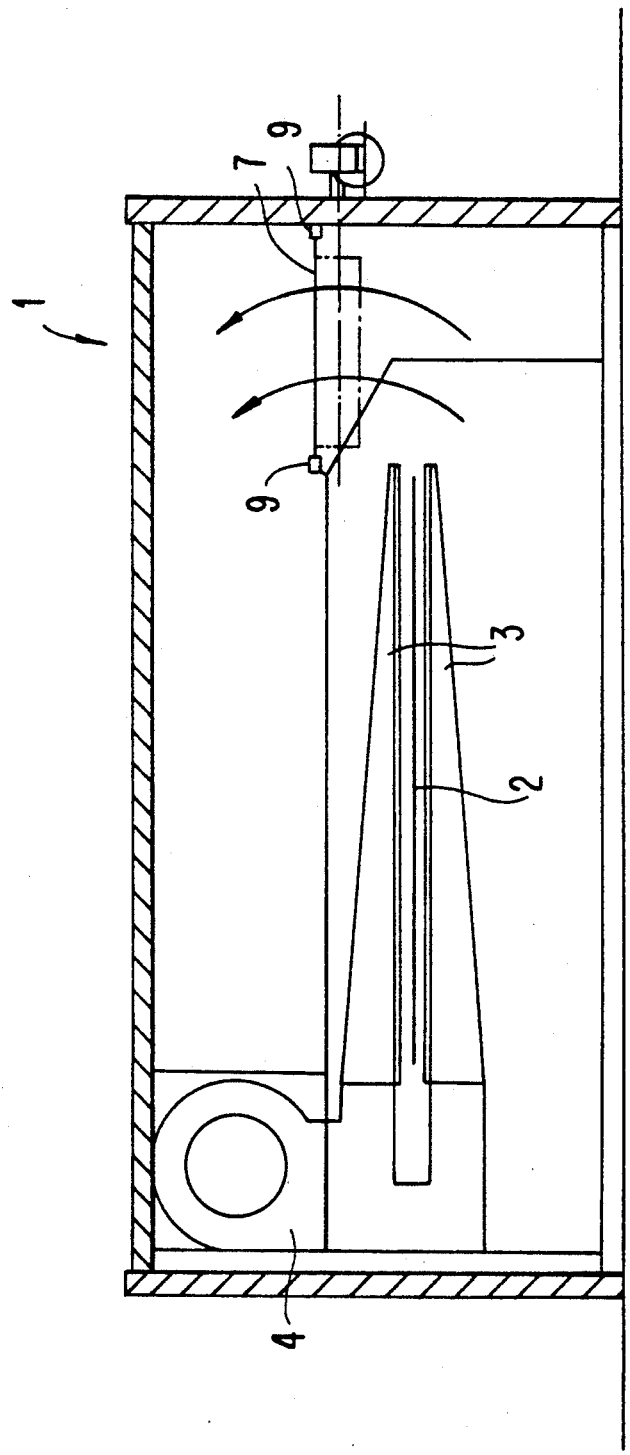
FIG. 2, a vertical transverse section through the tenter and the filtering device according to FIG. 1.
Figure 3:
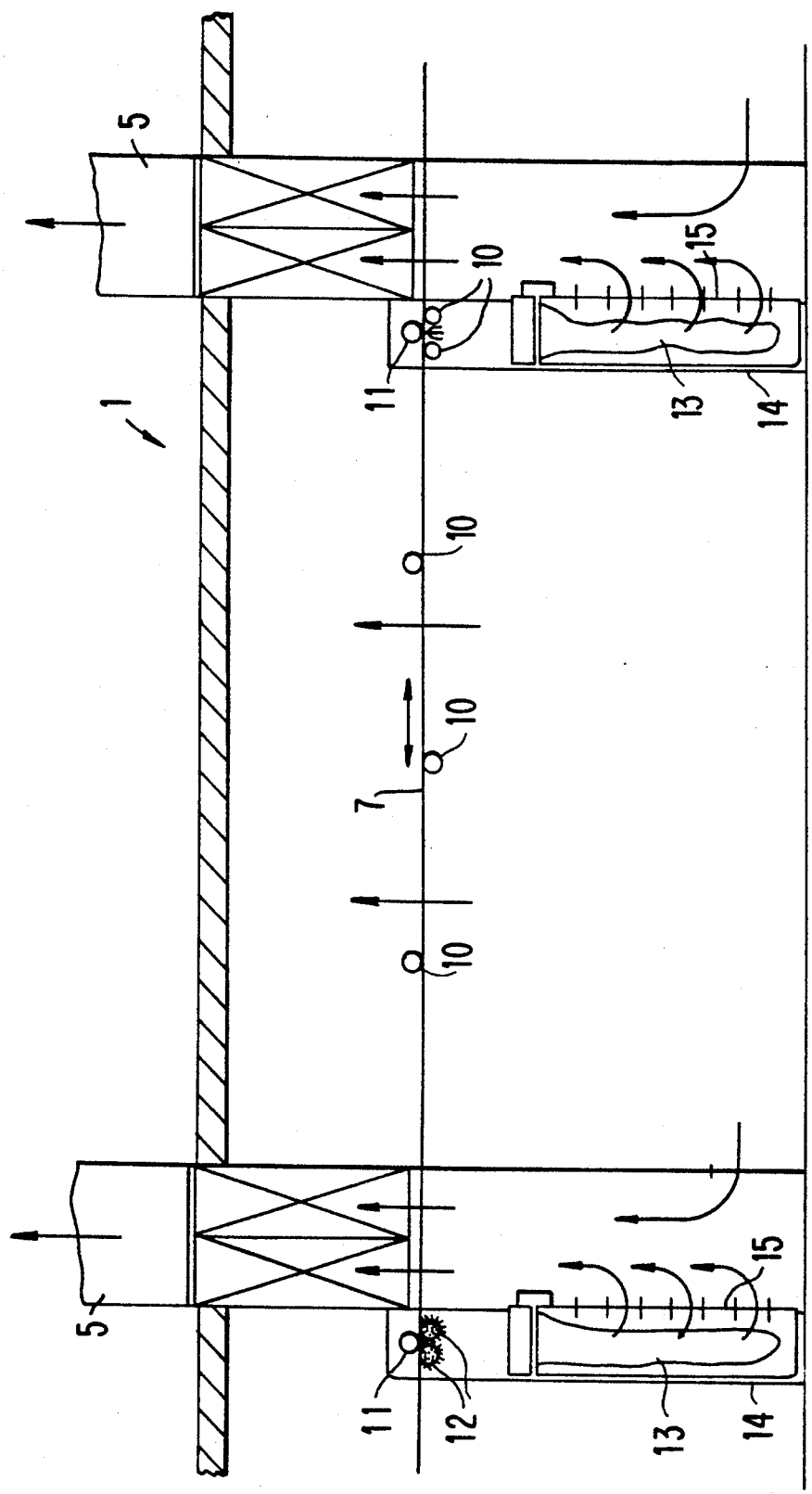
FIG. 3, a vertical longitudinal section through a tenter field on a larger scale than FIG. 1 and 2.

On either side of screen belt 7, the edges thereof are guided in tracks 9 (FIG. 2). At intervals over the length of the tenter, support rods 10 are provided in each field on the underside and top side of screen belt 7.

Above the screen belt 7, that is, on its clean side, there is arranged in each field at least one pressure line 11 extending over the screen belt width which is equipped with nozzles (not shown). Below the screen belt 7, that is, on the impurity-laden side, rotating brushes are arranged in the vicinity of the action zone of the nozzles, or simply additional support rods 10, to intensify the cleaning process or respectively to hold the screen belt 7 in position.

Below the rotating brushes 12 or respectively the additional support rods 10, a collecting means 13 is disposed, comprising a bag which is suspended in a housing 14 in such a way that the upwardly pointing bag opening corresponds to the horizontal clear cross section of the housing 14. A perforated wall 15 of housing 14 forms at the same time a wall of the waste gas duct 5, so that the vacuum prevailing therein continues into the housing 14 and into the interior of bag 13.

While the screen belt 7 is being unwound from a winding shaft 8 and taken up on the other winding shaft 8, scavenging air blown via the pressure lines and their nozzles through the screen belt 7, brings about a cleaning effect, augmented by the rotation of the brushes 12, the particles detached from screen belt 7 getting into the bag 13, which can be removed from housing 14 through a door opening therein (not shown) and can be replaced by a new bag 13 in a simple manner.

As the screen belt 7 does not only extend over the total cross section of the circulated gas stream, but also crosses all waste gas ducts 5 and extends over their cross section, there occurs an effective total filtering also of the waste gases extracted from the treatment process via the waste gas blower 6 and to be discharges into the open. The device thus employs a unitary filtering system both for the recirculated gases and the discharges gases.

From the foregoing, it will be appreciated that there is provided in accordance with the invention an improved filtering system which eliminates the requirement for the redundant filter systems of conventional systems. The device permits simplified clearing of collected dust and fibers by disposal of bags.

As will be apparent to skilled workers in the art familiarized with the instant disclosure, numerous variations in details of construction may be made without departing from the spirit of the invention which is thus to be broadly construed within the scope of the appended claims.

We claim:

1. In a filtering device for the gaseous treatment medium of a tenter for the hot treatment of a textile web, said device being of type which includes a pervious filter screen belt means movable through the gas treatment stream, said belt means dividing said tenter into a first impurity-laden zone below said belt wherein said web is treated and a second impurity free zone above said belt, pressure lines in said second zone having nozzles directed toward said belt, waste collecting means in registry with said nozzles and a plurality of waste gas duct means under negative pressure traversing said first and second zones, the improvement wherein said waste gas duct means includes a transverse horizontal slot and said belt extends over the length of said tenter and is disposed within said slot, and wherein said waste collecting means includes housings disposed below said belt means, gas permeable bags disposed within said housings and opening toward said nozzles, said housings including openings leading to respective said waste gas duct means, the combination including means for progressively shifting the entire cross-section of said belt across the cross-section of said waste gas duct means defined by said slot.

2. A device in accordance with claim 1 and including brush means in said first zone engaging said belt means across the width thereof, said brush means being disposed in proximate relation to said nozzles of said pressure lines.

3. A filtering device in accordance with claim 2 wherein said brush means are rotatable about an axis parallel to the plane of said belt means.

4. A filtering device in accordance with claim 2 wherein said belt means is mounted in a distended condition between a pair of parallel rotatable winding shafts, said belt means being reciprocally shiftable from coiled condition on one said shaft to a coil condition on the other said shaft.

5. A filtering device in accordance with claim 4 and including track means slidably supporting the side edges of said belt means.

6. A filtering device in accordance with claim 4 and including support rod means in said zones for engaging and supporting opposite surfaces of said belt.

* * * * *